US007499008B2

(12) United States Patent
Chen et al.

(10) Patent No.: US 7,499,008 B2
(45) Date of Patent: Mar. 3, 2009

(54) LIQUID CRYSTAL DISPLAY PANEL INCLUDING MULTI SCANNING BANDS

(75) Inventors: Li-Yi Chen, Tainan Hsien (TW); Wen-Tsung Lin, Tainan Hsien (TW)

(73) Assignee: Chi Mei Optoelectronics Corporation, Shin-Shih Village, Tainan Science-Based Industrial Park, Tainan Hsien (TW)

( * ) Notice: Subject to any disclaimer, the term of this patent is extended or adjusted under 35 U.S.C. 154(b) by 522 days.

(21) Appl. No.: 10/605,791

(22) Filed: Oct. 27, 2003

(65) Prior Publication Data

US 2004/0119705 A1 Jun. 24, 2004

(30) Foreign Application Priority Data

Nov. 1, 2002 (TW) .............................. 91132451 A

(51) Int. Cl.
*G09G 3/36* (2006.01)
*G09G 5/00* (2006.01)
*G06F 3/038* (2006.01)

(52) U.S. Cl. ............................ 345/87; 345/98; 345/99; 345/100; 345/204

(58) Field of Classification Search ........... 345/98–100, 345/904, 204, 87
See application file for complete search history.

(56) References Cited

U.S. PATENT DOCUMENTS

| | | | | |
|---|---|---|---|---|
| 6,618,101 | B1 * | 9/2003 | Kim et al. | 349/54 |
| 7,136,040 | B1 * | 11/2006 | Park et al. | 345/100 |
| 2002/0063671 | A1 * | 5/2002 | Knapp | 345/87 |
| 2006/0055645 | A1 * | 3/2006 | Kim | 345/87 |

* cited by examiner

*Primary Examiner*—Sumati Lefkowitz
*Assistant Examiner*—Alexander S. Beck
(74) *Attorney, Agent, or Firm*—Winston Hsu

(57) ABSTRACT

A display panel includes a first scanning band, a second scanning band, and a third scanning band positioned between the first scanning band and the second scanning band, and each scanning band includes a plurality of parallel scanning lines. The display panel further includes a plurality of parallel data lines extending across the first scanning band, the second scanning band, and the third scanning band. Each of the data lines includes a disconnecting point positioned in the third scanning band with a mosaic distribution.

20 Claims, 3 Drawing Sheets

LIQUID CRYSTAL DISPLAY PANEL INCLUDING MULTI SCANNING BANDS

BACKGROUND OF INVENTION

1. Field of the Invention

The present invention relates to a liquid crystal display (LCD) panel including multi scanning bands.

2. Description of the Prior Art

The advantages of the liquid crystal display (LCD) include lighter weight, less electrical consumption, and less radiation contamination. Thus, the LCD has been widely applied to several portable information products, such as notebooks, PDAs, etc. The LCD gradually replaces CRT monitors of conventional desktop computers.

Generally speaking, the LCD comprises an upper panel, a lower panel, and a liquid crystal layer filled between the upper panel and the lower panel. The upper panel includes a common electrode and a plurality of color filters, and the lower panel includes a plurality of pixel electrodes, a plurality of thin film transistors, and a driving circuit. Furthermore, each of the pixel electrodes and the common electrode form a capacitor, and each capacitor and each thin film transistor together form a pixel unit with a matrix distribution.

Incident light will produce different polarization or refraction when the alignments of liquid crystal molecules are different, therefore, the LCD utilizes the potential difference between the pixel electrode and the common electrode to change the alignments of these molecules of the liquid crystal layer, and the liquid crystal molecules with different alignments are further used to control the light transmittance of each pixel unit so as to generate light beams with different intensities of gray level or to generate red, blue, and green lights with different brightness. Therefore, the LCD is enabled to produce gorgeous images.

FIG. 1 is a block diagram showing a prior art liquid crystal display and a driving circuit thereof. As shown in FIG. 1, a liquid crystal display panel 10 comprises a driving circuit (not shown in FIG. 1) and a plurality of pixel units (not shown in FIG. 1) with a matrix distribution. The driving circuit includes a plurality of scanning lines 12 used for transmitting scanning signals to each pixel unit and also includes a plurality of data lines 14 used for transmitting image data to each pixel unit. Therein, a plurality of rows of the pixel units are arranged on the display panel 10 respectively corresponding to the scanning lines 12, and a plurality of columns of the pixel units are arranged on the display panel 10 respectively corresponding to the data lines 14. A thin film transistor of each pixel unit is electrically controlled by both a scanning line and a data line and is driven by signals from the scanning line and the data line. Additionally, the scanning lines 12 horizontally arranged on the display panel 10 are electrically connected with a gate driver 16, and the data lines 14 vertically arranged on the display panel 10 are electrically connected with a data driver 18, which is further electrically connected with a signal supplier 20.

A conventional driving method of the prior art liquid crystal display panel 10 shown in FIG. 1 is described as follows. First, the image data is inputted from outside into the signal supplier 20, and then the image data is transmitted from the signal supplier 20 to the data driver 18. After that, a start signal is applied to the gate driver 18, and then the gate driver 18 supplies a first scanning signal to the first row scanning line 13 so as to turn on the thin film transistors electrically connected with the first row scanning line 13. The data driver 18 then uses the data lines 14 to transmit corresponding image data to the first row pixel units arranged on the display panel 10. Therefore, each of the first row pixel units is enabled to display an image.

When the application of the first scanning signal for the first row scanning line 13 is finished, the gate driver 16 supplies a second scanning signal to the second row scanning line 15. At this time, the thin film transistors electrically connected with the first row scanning line 13 are turned off while the thin film transistors electrically connected with the second scanning line 15 are turned on, and the data driver 18 uses the data lines 14 to transmit another corresponding image data to the second row pixel units arranged on the display panel 10. By way of the above-described method, the pixel units arranged on the display panel 10 are sequentially scanned from the first row to the last row. When the scanning of the last row pixel units is completed, a frame is completely displayed by the liquid crystal display panel 10, a scanning signal is applied to the first row scanning line 13 again, and so the next frame begins.

However, since the more scanning lines become required as the resolution of the liquid crystal display becomes higher, the time required for one frame scanning remains limited, and the scanning time of one scanning line is reduced. For a liquid crystal panel comprising 800 scanning lines and having a refresh frequency of 60 hertz (Hz), each scanning line has to finish scanning in 20.8 μs. When the number of scanning lines increases as 1080 for higher resolution, each scanning line has to finish scanning in 15.4 μs. Therefore, a scan delay easily occurs, and thus the image quality becomes worse. For the liquid crystal display panel of larger size, the scan delay is more obvious.

Another prior art liquid crystal display panel with dual scanning bands is developed for solving the above-mentioned problem. As shown in FIG. 2, the liquid crystal display panel 30 comprises a first scanning band 32, a second scanning band 34, a driving circuit (not shown in FIG. 2), and a plurality of pixel units (not shown in FIG. 2) with a matrix distribution. The driving circuit includes a plurality of scanning lines 36 positioned in the first scanning band 32 and used for transmitting scanning signals to each pixel unit of the first scanning band 32, and the driving circuit also includes a plurality of data lines 38 used for transmitting image data to each pixel unit of the first scanning band 32. As well, the driving circuit includes a plurality of scanning lines 40 positioned in the second scanning band 34 and used for transmitting scanning signals to each pixel unit of the second scanning band 34, and the driving circuit also includes a plurality of data lines 42 used for transmitting image data to each pixel unit of the second scanning band 34. The data lines 38 of the first scanning band 32 are disconnected from the data lines 42 of the second scanning band 34.

According to the position of the scanning line 36 and the scanning 40, a plurality of rows of pixel units are arranged respectively in the first scanning band 32 and the second scanning band 34 of the display panel 30. As well, according to the position of the data line 38 and the data line 42, a plurality of columns of pixel units are arranged respectively in the first scanning band 32 and the second scanning band 34 of the display panel 30. A thin film transistor of each pixel unit in the first scanning band 32 and the second scanning band 34 is electrically controlled by both a scanning line and a data line and is driven by signals from the scanning line and the data line. Additionally, the scanning line 36 horizontally arranged in the first scanning band 32 and the scanning line 40 horizontally arranged in the second scanning band 34 are simultaneously connected with a gate driver 44, while the data line 38 vertically arranged in the first scanning band 32 and the date line 42 vertically arranged in the second scanning band 34 are respectively connected with a first data driver 46 and a second data driver 48. The first data driver 46 and the second data driver 48 are electrically connected with a memory 50, which is further electrically connected with a signal supplier 52.

A conventional driving method of the prior art liquid crystal display panel 30 shown in FIG. 2 is described as follows. First, the image data is inputted from outside into the signal supplier 52, and then the image data is transmitted from the signal supplier 52 to the memory 50. The image data stored in the memory 50 is further transmitted to the first data driver 46 and the second data driver 48, respectively. After that, a start signal is applied to the gate driver 44, and then the gate driver 44 supplies a scanning signal to the first row scanning line 31 of the first scanning band 32 and also to the first row scanning line 41 of the second scanning band 34. Consequently, the thin film transistors electrically connected with the first row scanning line 32 of the first scanning band 32 and the first row scanning line 41 of the second scanning band 34 are turned on. The first data driver 46 and the second data driver 48 then respectively use the data line 38 and the data line 42 to transmit corresponding image data to the first row pixel units arranged in the first scanning band 32 and the first row pixel units arranged in the second scanning band 34.

When the application of the scanning signal for the first row scanning line 31 of the first scanning band 32 and the first row scanning line 41 of the second scanning band 34 is finished, the gate driver 44 supplies another scanning signal simultaneously to the second row scanning line 33 of the first scanning band 32 and the second row scanning line 43 of the second scanning band 34. At this time, the thin film transistors electrically connected with the first row scanning line 31 of the first scanning band 32 and the first row scanning line 41 of the second scanning band 34 are turned off, while the thin film transistors electrically connected with the second scanning line 33 of the first scanning band 32 and the second row scanning line 43 of the second scanning band 34 are turned on. Therefore, the first data driver 46 and the second data driver 48 are able to respectively use the data lines 38 and the data lines 42 to transmit corresponding image data to the second row pixel units arranged in the first scanning band 32 and the second row pixel units arranged in the second scanning band 34. By way of the above-described method, the pixel units arranged in the first scanning band 32 and the second scanning band 34 are sequentially scanned from the first row to the last row. When the scanning of the last row pixel units is completed, a frame is completely displayed by the liquid crystal display panel 30, a scanning signal is applied to the first row scanning line 31 of the first scanning band 32 and the first row scanning line 41 of the second scanning band 34 again, and so the next frame begins.

According to the prior art liquid crystal display panel 30 with dual scanning bands, the scanning lines of the first scanning band 32 and the second scanning band 34 are simultaneously scanned. Consequently, the scanning time required for a frame is reduced by half, and the problem of scan delay is prevented. For a liquid crystal panel comprising 1080 scanning lines and having a refresh frequency of 60 hertz (Hz), each scanning line has to finish scanning in 30.8 μs. However, the boundary 53 between the first scanning band 32 and the second scanning band 34 is easily observed by our vision, which results in a non-uniform image quality of the display panel 30.

SUMMARY OF INVENTION

It is therefore an objective of the claimed invention to provide an LCD panel with multi scanning bands for preventing a scan delay and improving a non-uniform image quality of the prior art display panel.

According to the claimed invention, a display panel comprises a first scanning band, a second scanning band, and a third scanning band positioned between the first scanning band and the second scanning band, and each scanning band includes a plurality of parallel scanning lines. The display panel further comprises a plurality of parallel data lines extending across the first scanning band, the second scanning band, and the third scanning band. Each of the data lines includes a disconnecting point positioned in the third scanning band with a mosaic distribution.

The liquid crystal display panel of the claimed invention comprises a first scanning band, a second scanning band and a third scanning band and also comprises a plurality of data lines, therein each data line includes a disconnecting point positioned in the third scanning band. A plurality of scanning lines scan the first scanning band and the second scanning band simultaneously, after that, the scanning lines scan the third scanning band. Therefore, each scanning line gains more time to finish scanning, and an occurrence of scan delay is prevented. Additionally, the disconnecting points of the data lines are distributed in a mosaic, therefore, there is no obvious boundary formed, and a non-uniform image quality of the prior art LCD panel is improved.

These and other objectives of the claimed invention will no doubt become obvious to those of ordinary skill in the art after reading the following detailed description of the preferred embodiment, which is illustrated in the multiple figures and drawings.

DETAILED DESCRIPTION

Figure 1:
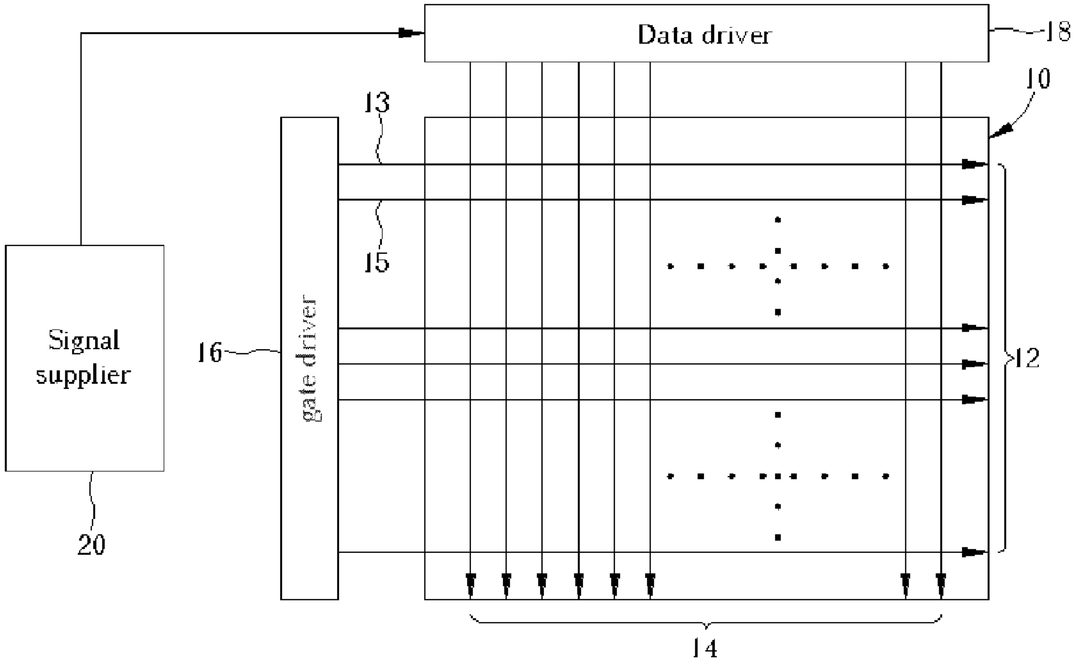
Fig. 1 Prior art
FIG. 1 is a block diagram showing a prior art liquid crystal display and a driving circuit thereof.
Figure 2:
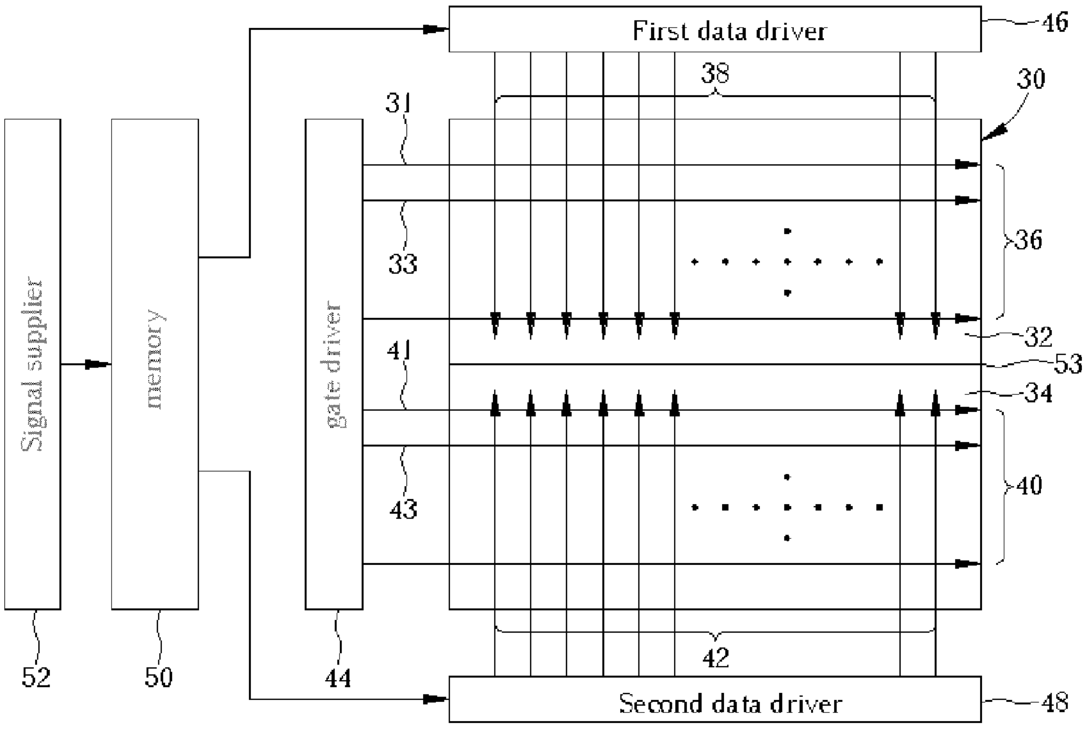
Fig. 2 Prior art
FIG. 2 is a block diagram showing another prior art liquid crystal display with dual scanning bands and a driving circuit thereof.
Figure 3:
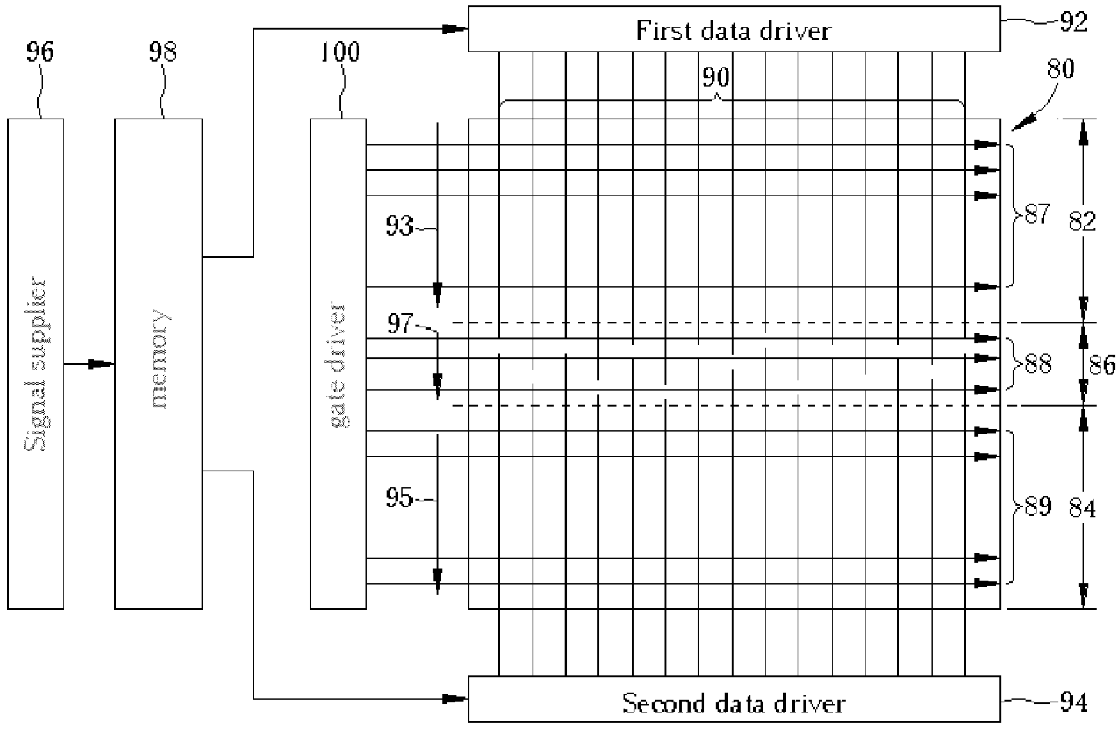
FIG. 3 is a sectional view of a liquid crystal display panel of the present invention.

FIG. 3 is a sectional view of a liquid crystal display panel of the present invention. As shown in FIG. 3, the display panel 80 comprises a first scanning band 82, a second scanning band 84, and a third scanning band 86 positioned between the first scanning band 82 and the second scanning band 84, and each scanning band 82, 84, 86 includes a plurality of parallel scanning lines 87, 88, 89. The display panel 80 further comprises a plurality of parallel data lines 90 extending across the first scanning band 82, the second scanning band 84, and the third scanning band 86, and the data lines 90 and the scanning lines 87, 88, 89 are perpendicular to each other. A plurality of pixel units (not shown in FIG. 3) are respectively positioned around an intersection point of one scanning line and one data line and electrically controlled by both the scanning line and the data line. The display panel 80 also comprises a first data driver 92 and a second data driver 94 both electrically connected with the data lines 90 for inputting image data into each pixel unit, a signal supplier 96 for supplying each pixel unit with the image data, a memory 98 for storing the image data supplied by the signal supplier 96 and then outputting the image data into the first data driver 92 and the second data driver 94, and a gate driver 100 for applying scanning signals to the scanning lines 87, 88, 89 of each scanning band 82, 84, 86.

According to the liquid crystal display panel 80 of the present invention, each data line 90 includes a disconnecting point (not shown in FIG. 3) positioned in the third scanning band 86, and the disconnecting points are distributed in a mosaic. Therefore, the display panel 80 of the present invention is operated by a specific driving method. In a preferred embodiment of the present invention, the driving method first simultaneously scans the first scanning band 82 and the second scanning band 84 and then scans the third scanning band 86.

The driving method of the liquid crystal display panel 80 of the present invention is described as follows. First, the image data is transmitted from the signal supplier 96 to the memory 98. The image data stored in the memory 98 is then transmitted to the first data driver 92 and the second data driver 94, respectively. When simultaneously scanning the first scanning band 82 and the second scanning band 84, the first data driver 92 uses the data lines 90 to input the image data into each pixel unit positioned in the first scanning band 82, and the second data driver 94 uses the data lines 90 to input the image data into each pixel unit positioned in the second scanning band 84. At this time, the gate driver 100 applies a first scanning signal to the scanning lines 87 of the first scanning band 82 in sequence according to a first direction 93 so as to enable the pixel unit electrically controlled by each scanning line of the first scanning band to accept a corresponding image data. As well, the gate driver 100 simultaneously applies the first scanning signal to the scanning lines 89 of the second scanning band 84 in sequence according to a second scanning direction 95 so as to enable the pixel unit electrically controlled by each scanning line 89 of the second scanning band 84 to accept a corresponding image data.

The data lines 90 include a plurality of disconnecting points positioned in the third scanning band 86 and distributed in a mosaic. Therefore, in the third scanning band 86, the pixel units positioned above the disconnecting points are supplied with the image data by the first data driver 92, and the pixel units positioned below the disconnecting points are supplied with the image data by the second data driver 94. In other words, when scanning the third scanning band 86, the first data driver 92 and the second data driver 94 simultaneously input the same image data to the pixel units electrically controlled by the same data line 90, i.e. the first data driver 92 and the second data driver 94 simultaneously input the same image data into the third scanning band 86. At this time, the gate driver 100 applies a second scanning signal to the scanning lines 88 of the third scanning band 86 in sequence according to a third direction 97 so as to enable the pixel unit electrically controlled by each scanning line 88 of the third scanning band 86 to accept a corresponding image data. Consequently, whether the pixel units in the third scanning band 86 are positioned above or below the disconnecting points, the display of the pixel units can be controlled by simultaneously supplying with the same image data by the first data driver 92 and the second data driver 94.

However, the above-mentioned first scanning direction 93, the second scanning direction 95, and the third scanning direction 97 do not represent the only embodiment of the present invention. According to other embodiments of the present invention, the first scanning direction 93 and the second scanning direction 95 may be identical or opposite, and the third scanning direction 97 may be the same as or opposite to the first scanning direction 93 and the second scanning direction 95, respectively. Specifically, while the first scanning direction 93 and the second scanning direction 95 are identical, the third scanning direction 97 may be the same as or opposite to the first scanning direction 93, and while the first scanning direction 93 and second scanning direction 95 are opposite, the third scanning direction 97 may be the same as or opposite to the first scanning direction 93. Additionally, the number of the scanning lines of the first scanning band 82, the second scanning band 84 and the third scanning band 86 is not limited, but the first scanning band 82 preferably comprises the same number of scanning lines as the second scanning band 84 for obtaining a better image quality. Furthermore, the number of scanning bands of the present invention is not limited to three, and the disconnecting points of the data lines can be positioned in more than one scanning band and distributed in a mosaic for preventing from being observed by our vision.

The liquid crystal display panel of the present invention comprises a first scanning band, a second scanning band, and a third scanning band and also comprises a plurality of data lines, therein each data line includes a disconnecting point positioned in the third scanning band. A plurality of scanning lines scan the first scanning band and the second scanning band simultaneously, and after that, the scanning lines scan the third scanning band. Therefore, each scanning line gains more time to finish scanning, and an occurrence of scan delay is prevented. Additionally, the disconnecting points of the data lines are distributed in a mosaic, therefore, there is no obvious boundary formed, and a non-uniform image quality of the prior art LCD panel is improved.

For a liquid crystal panel of the present invention comprising 1080 scanning lines and having a refresh frequency of 60 hertz (Hz), when the first scanning band and the second scanning band respectively include 515 scanning lines and the third scanning band include 50 scanning lines, each scanning line has to finish scanning in 29.5 μs. Comparing to the scanning time (15.4 μs) of each scanning line of the prior art display panel, the scanning time of each scanning line of the present invention increases by more than 90%. Comparing to the prior art display panel with dual scanning bands, the disconnecting points of data lines of the present invention are distributed in a mosaic, therefore, there is no obvious boundary formed, and a non-uniform image quality of the prior art LCD panel is improved.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A display panel comprising:

a first scanning band, a second scanning band and a third scanning band positioned between the first scanning band and the second scanning band, and each scanning band including a plurality of parallel scanning lines, wherein the scanning lines of the first scanning band and the second scanning band scan along a first scanning direction and a second scanning direction according to a first scanning signal;

a plurality of parallel data lines extending across the first scanning band, the second scanning band and the third scanning band, the data lines and the scanning lines being perpendicular to each other, and each of the data lines including a disconnecting point positioned in the third scanning band with a mosaic distribution;

a plurality of pixel units, each pixel unit being positioned around an intersection point of one scanning line and one data line and being electrically controlled by both the scanning line and the data line; and a first data driver and a second data driver electrically connected to the data lines for inputting image data into each pixel unit, such that when scanning the first scanning band and the second scanning band simultaneously, the first data driver inputs the corresponding image data into the first scanning band and the second data driver inputs the corresponding image data into the second scanning band, and when the scanning lines of the third scanning band scan in sequence along a third scanning direction according to a second scanning signal sequential to the simultaneous scanning of the first and second bands; wherein the display of the pixel units is controlled by simultaneously supplying with the same image data by the first data driver and the second data driver whether the pixel units in the third scanning band are positioned above or below the disconnecting point.

2. The display panel of claim 1 further comprising a signal supplier for supplying each pixel unit with the image data.

3. The display panel of claim 1 further comprising a memory for storing the image data supplied by the signal supplier, with the stored image data being further outputted from the memory into the first data driver and the second data driver.

4. The display panel of claim 3 further comprising a gate driver for applying scanning signals to the scanning lines of each scanning band.

5. The display panel of claim 4, wherein when the first data driver and the second data driver respectively input the image data into each pixel unit positioned in the first scanning band and the second scanning band, the gate driver applies the first scanning signal to the scanning lines of the first scanning band in sequence according to the first scanning direction so as to enable the pixel unit electrically controlled by each scanning line of the first scanning band to accept a corresponding image data, and the first scanning signal is simultaneously applied to the scanning lines of the second scanning band in sequence according to the second scanning direction so as to enable the pixel unit electrically controlled by each scanning line of the second scanning band to accept a corresponding image data.

6. The display panel of claim 5 wherein the gate driver applies the second scanning signal to the scanning lines of the third scanning band in sequence according to the third scanning direction.

7. The display panel of claim 6 wherein the first scanning direction and the second scanning direction are identical.

8. The display panel of claim 7 wherein the third scanning direction and the first scanning direction are identical.

9. The display panel of claim 7 wherein the third scanning direction and the first scanning direction are opposite.

10. The display panel of claim 6 wherein the first scanning direction and the second scanning direction are opposite.

11. The display panel of claim 10 wherein the third scanning direction and the first scanning direction are identical.

12. The display panel of claim 10 wherein the third scanning direction and the first scanning direction are opposite.

13. A driving method for a liquid crystal display panel including a first scanning band, a second scanning band, a third scanning band positioned between the first scanning band and the second scanning band, a plurality of scanning lines, a plurality of data lines including a disconnecting point positioned in the third scanning band with a mosaic distribution, a first data driver and a second data driver, and a plurality of pixel units positioned around an intersection point of one scanning line and one data line, comprising the steps of:

scanning the first scanning band and the second scanning band simultaneously according to a first direction and a second direction respectively based on a first scanning signal;

inputting a corresponding image data from the first data driver into each pixel unit positioned in the first scanning band via the data lines;

inputting a corresponding image data from the second data driver into each pixel unit positioned in the second scanning band via the data lines;

scanning the third scanning band in sequence according to a third direction based on a second scanning signal sequential to the simultaneous scanning of the first and second bands; and controlling the display of the pixel units by simultaneously supplying with the same image data by the first data driver and the second data driver whether the pixel units in the third scanning band are positioned above or below the disconnecting points.

14. The driving method for a liquid crystal display panel of claim 13, further comprising:

applying the first scanning signal to the scanning lines of the first scanning band in sequence according to the first direction to enable the pixel unit electrically controlled by each scanning line of the first scanning band to accept the corresponding image data; and applying the first scanning signal to the scanning lines of the second scanning band in sequence according to the second direction to enable the pixel unit electrically controlled by each scanning line of the second scanning band to accept the corresponding image data.

15. The driving method for a liquid crystal display panel of claim 13 wherein the first scanning direction and the second scanning direction are identical.

16. The driving method for a liquid crystal display panel of claim 15 wherein the third scanning direction and the first scanning direction are identical.

17. The driving method for a liquid crystal display panel of claim 15 wherein the third scanning direction and the first scanning direction are opposite.

18. The driving method for a liquid crystal display panel of claim 13 wherein the first scanning direction and the second scanning direction are opposite.

19. The driving method for a liquid crystal display panel of claim 18 wherein the third scanning direction and the first scanning direction are identical.

20. The driving method for a liquid crystal display panel of claim 18 wherein the third scanning direction and the first scanning direction are opposite.

* * * * *